(12) United States Patent
Tavares et al.

(10) Patent No.: US 10,002,349 B2
(45) Date of Patent: Jun. 19, 2018

(54) SYSTEM AND METHOD FOR EVALUATING TRANSACTION PATTERNS

(71) Applicant: First Data Corporation, Greenwood Village, CO (US)

(72) Inventors: Silvio Tavares, NE Atlanta, GA (US); Susan Fahy, Melville, NY (US); Dennis Carlson, NE Atlanta, GA (US)

(73) Assignee: First Data Corporation, Greenwood Village, CO (US)

( * ) Notice: Subject to any disclaimer, the term of this patent is extended or adjusted under 35 U.S.C. 154(b) by 963 days.

(21) Appl. No.: 13/782,018

(22) Filed: Mar. 1, 2013

(65) Prior Publication Data

US 2013/0231976 A1   Sep. 5, 2013

Related U.S. Application Data

(60) Provisional application No. 61/606,707, filed on Mar. 5, 2012.

(51) Int. Cl.
| | | |
|---|---|---|
| G06Q 20/00 | (2012.01) | |
| G06Q 20/20 | (2012.01) | |
| G06Q 30/02 | (2012.01) | |
| G06Q 20/30 | (2012.01) | |

(52) U.S. Cl.
CPC ........... *G06Q 20/202* (2013.01); *G06Q 20/30* (2013.01); *G06Q 30/0201* (2013.01); *G06Q 30/0205* (2013.01)

(58) Field of Classification Search
None
See application file for complete search history.

(56) References Cited

U.S. PATENT DOCUMENTS

| | | | | |
|---|---|---|---|---|
| 5,832,458 A * | 11/1998 | Jones | ............ | G06Q 20/202 705/14.26 |
| 6,078,891 A * | 6/2000 | Riordan | ............ | G06Q 20/20 705/16 |
| 6,633,851 B1 | 10/2003 | Engler et al. | | |
| 6,839,682 B1 * | 1/2005 | Blume | ............ | G06Q 30/02 705/14.4 |
| 7,328,169 B2 * | 2/2008 | Temares | ............ | G06Q 30/02 705/14.25 |
| 7,792,697 B2 * | 9/2010 | Bhagchandani | ............ | G06Q 30/02 705/14.49 |
| 7,890,367 B2 | 2/2011 | Senghore et al. | | |
| 7,937,286 B2 * | 5/2011 | Newman | ............ | G06Q 30/02 705/7.31 |
| 8,027,891 B2 * | 9/2011 | Preston | ............ | G06Q 40/00 705/30 |
| 8,255,268 B2 * | 8/2012 | Rane | ............ | G06Q 30/0202 705/7.33 |
| 8,328,094 B2 * | 12/2012 | Proud | ............ | G06Q 20/20 235/383 |
| 8,417,561 B2 * | 4/2013 | Ghosh | ............ | G06Q 30/0205 705/7.34 |

(Continued)

*Primary Examiner* — Gurkanwaljit Singh
(74) *Attorney, Agent, or Firm* — Kilpatrick Townsend & Stockton LLP

(57) ABSTRACT

Transaction data is collected from POS terminals in order to generate transaction paths for account holders. The transaction paths link merchant locations where transactions are conducted. Common features of transaction paths, such as intersecting path locations, and transaction data associated with the merchant locations are used for marketing and other purposes.

26 Claims, 4 Drawing Sheets

(56) References Cited

U.S. PATENT DOCUMENTS

| | | | |
|---|---|---|---|
| 9,208,481 B2 * | 12/2015 | Arzumanyan | G06Q 20/0453 |
| 2002/0026348 A1 * | 2/2002 | Fowler | G06Q 30/02 |
| | | | 705/14.11 |
| 2003/0018550 A1 * | 1/2003 | Rotman | G06Q 30/02 |
| | | | 705/35 |
| 2003/0216981 A1 * | 11/2003 | Tillman | G06Q 20/04 |
| | | | 705/34 |
| 2004/0260607 A1 | 12/2004 | Robbins et al. | |
| 2006/0151598 A1 * | 7/2006 | Chen | G06O 20/20 |
| | | | 235/380 |
| 2007/0050229 A1 * | 3/2007 | Tatro | G06Q 10/087 |
| | | | 705/15 |
| 2007/0055597 A1 * | 3/2007 | Patel | G06Q 30/0206 |
| | | | 705/35 |
| 2007/0100728 A1 * | 5/2007 | Rotman | G06Q 30/02 |
| | | | 705/36 R |
| 2008/0262900 A1 | 10/2008 | Duffy et al. | |
| 2009/0006151 A1 * | 1/2009 | Zarghami | G06Q 10/06375 |
| | | | 705/7.31 |
| 2009/0319931 A1 | 12/2009 | Hutchings et al. | |
| 2010/0010905 A1 * | 1/2010 | Arzumanyan | G06Q 20/0453 |
| | | | 705/21 |
| 2010/0070376 A1 * | 3/2010 | Proud | G06Q 20/20 |
| | | | 705/21 |
| 2010/0076813 A1 * | 3/2010 | Ghosh | G06Q 30/02 |
| | | | 705/7.34 |
| 2010/0280881 A1 * | 11/2010 | Faith | G06Q 10/06375 |
| | | | 705/7.34 |
| 2011/0087519 A1 * | 4/2011 | Fordyce, III | G06Q 30/02 |
| | | | 705/7.29 |
| 2011/0196754 A1 * | 8/2011 | Proud | G06Q 20/20 |
| | | | 705/16 |
| 2012/0109709 A1 * | 5/2012 | Fordyce, III | G06Q 30/02 |
| | | | 705/7.29 |

* cited by examiner

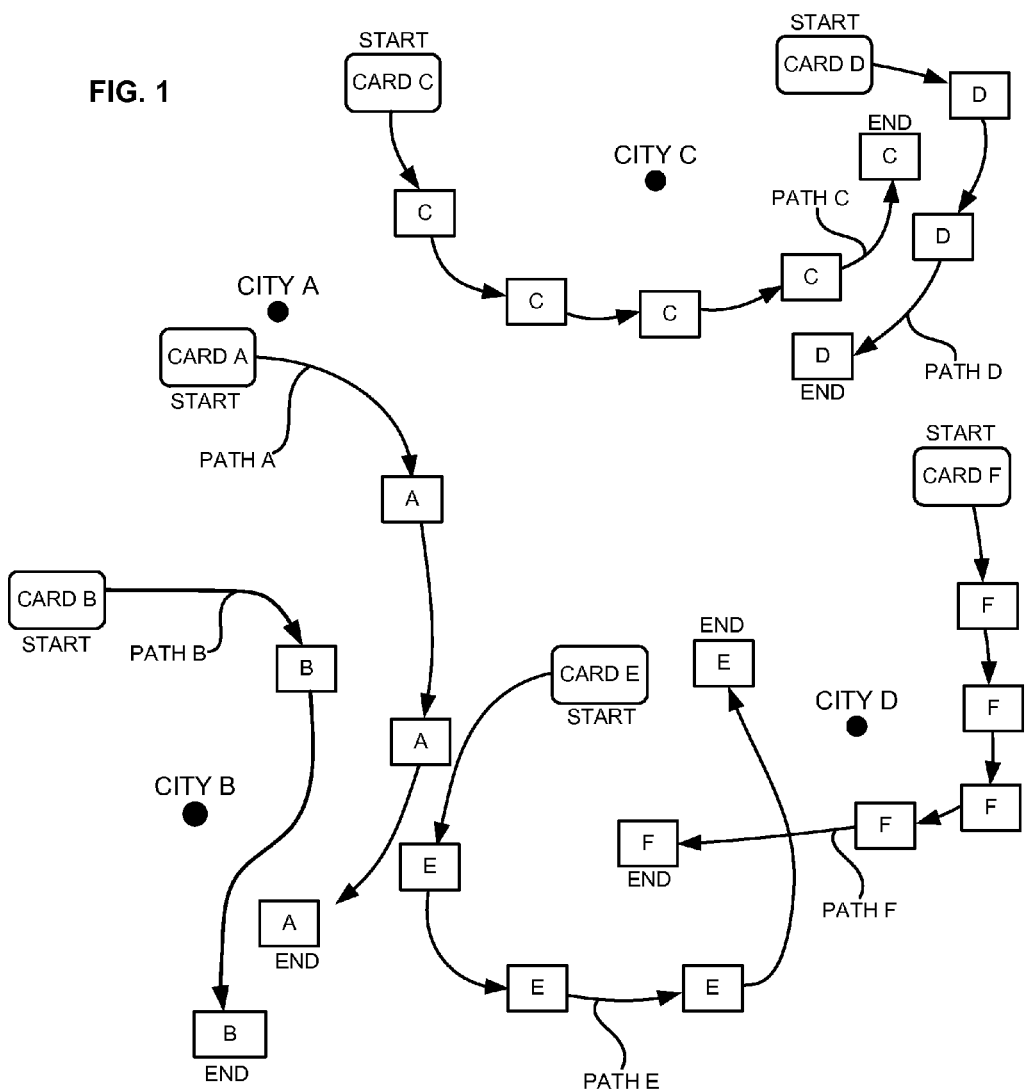

SYSTEM AND METHOD FOR EVALUATING TRANSACTION PATTERNS

This application claims the benefit of and is a non-provisional of U.S. Application Ser. No. 61/606,707 filed on Mar. 5, 2012, which is incorporated by reference in its entirety for all purposes.

BACKGROUND OF THE INVENTION

Researching market and consumer trends often involves analysis of many types and levels of data. For example, markets may be affected by various macro and micro economic trends, seasonal trends, social trends, corporate trends, etc. Each of these trends may, in turn, be affected by many other types of trends. While some trends may be observed in the analysis of market data, they may be complex and not easily applied to marketing decisions. It may be difficult to understand consumer patterns and trends without supplementing large amounts of diverse types of market data with extensive amounts of data mining, analysis, and assumptions.

One approach to obtaining market data is to have public and private entities indirectly obtain such data through interviews and/or other techniques. For example, a government employee may contact representative merchant locations to ask about sales and overall performance for a given timeframe (e.g., the past month). Investors may then obtain and analyze this indirect market information in making investment decisions (e.g., a decision on whether or not to invest in a new store location).

These and other techniques, however, may provide limited market information. For example, interviewed merchants or merchant locations may provide inaccurate information, and specific merchant information may not actually be representative of actual market conditions. Further, delays in obtaining these types of market data may be undesirable for investors and/or other stakeholders.

BRIEF SUMMARY OF THE INVENTION

There is provided, in accordance with embodiments of the present invention, a network/system and method for using transaction data collected and aggregated from point-of-sale (POS) terminals to generate, evaluate and report transaction paths of consumers.

In one embodiment, a method for evaluating transaction patterns of account holders comprises receiving and storing at a host computer system from POS devices a plurality of POS datasets for a plurality of transactions conducted by account holders, wherein each POS dataset comprises at least a merchant identifier, an account identifier, and a transaction amount. The POS datasets are evaluated to determine a merchant location for each of the transactions. A plurality of transaction paths are generated or developed based on the merchant locations and the POS datasets, with each transaction path representing a path of merchant locations for transactions conducted by an account holder. The plurality of transaction paths are evaluated to identify common features of the transaction paths. A report is generated showing the results of the evaluation of the transaction paths.

A more complete understanding of the present invention may be derived by referring to the detailed description of the invention and to the claims, when considered in connection with the Figures.

BRIEF DESCRIPTION OF THE DRAWINGS

FIG. 1 is a map of a geographical area illustrating, for several card holders, transaction paths generated in accordance with one embodiment of the invention.

FIG. 2 illustrates exemplary data associated with card holders.

DETAILED DESCRIPTION OF THE INVENTION

Figure 3:
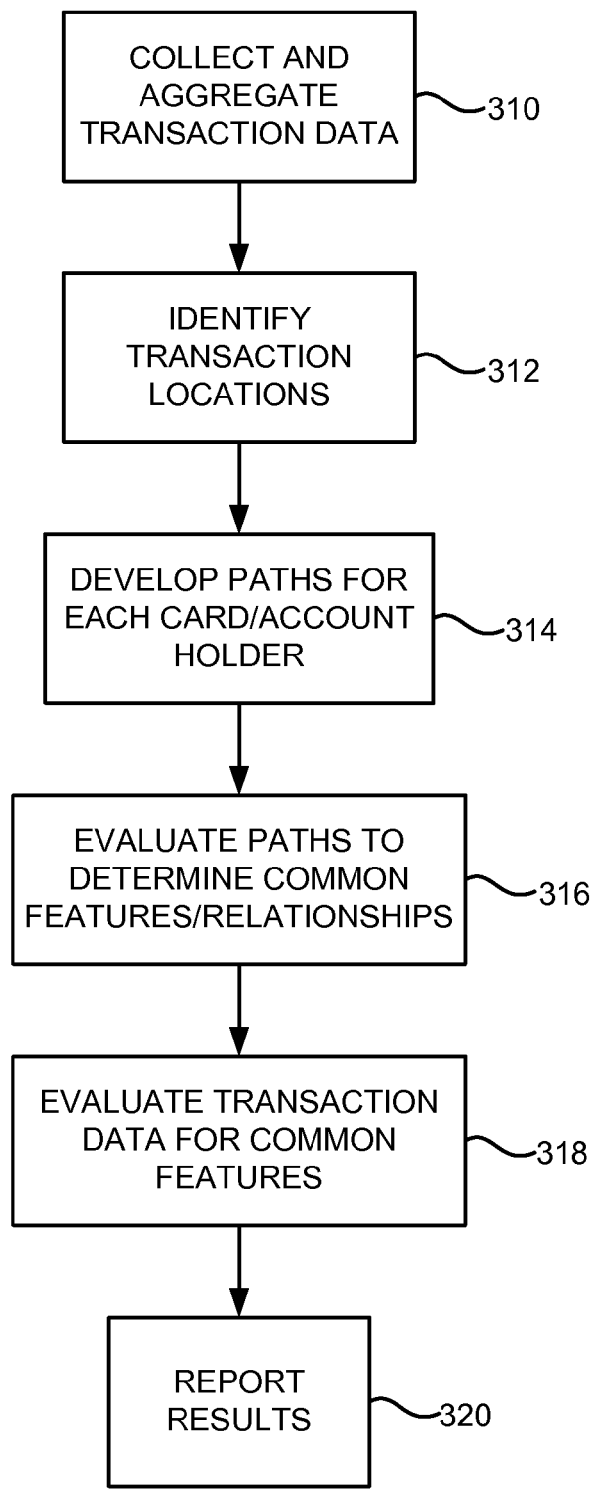
FIG. 3 is a flow diagram illustrating an exemplary process for generating and evaluating transaction paths.

Among other things, embodiments described herein use actual transaction data aggregated from point-of-sale (POS) terminals to generate, evaluate and report transaction patterns, such as paths of consumer travel when using financial and other accounts to make purchases. In some embodiments, the accounts are tied to a transaction card, such as a credit or debit card. However, in other embodiments the account could be any type of account that might be used to conduct a purchase or other transaction. For example, accounts used in some embodiments of the invention might include not only credit and debit card accounts, but also checking accounts, savings accounts, gift card accounts, brokerage accounts, and reward or loyalty accounts (e.g., accounts used for redeeming merchant reward points).

Described embodiments include developing transaction paths, which represent paths that an account holder (such as a consumer) might travel when using an account to conduct transactions. Thus, for example, geographical patterns and data resulting from these embodiments not only reflect merchant locations where a transaction is conducted, but also locations along path segments between the merchant locations.

In one embodiment, the developed transaction paths for different account holders can be evaluated to determine common features or characteristics of the paths. For example, if multiple paths intersect, it could be determined that different account holders (consumers) have a common location or point during their travel between merchant locations. Such a common location might be useful in evaluating market or other conditions pertaining to that location.

Data associated with the account holders and their transactions along a transaction path may be collected and used to understand consumer patterns. For example, data from transactions may indicate the spending habits or patterns of consumers who travel that path. If a number of transactions paths (of different accounts holders) intersect or are in very close proximity, and those consumers have certain common spending habits or patterns (e.g., as reflected by the types of businesses at which they use their accounts to make purchases), a common point in their paths may be a favorable place to put a business that would be consistent with their spending habits or patterns. As one simple example, if multiple consumers travel a common path or travel different paths that have some common or intersecting locations, and the transaction data associated with those consumers show frequent stops at coffee shops, then a reasonable location for opening a new coffee shop might be along that common path or at those common locations. As another example, personal and financial information associated with account holders may be used to match those account holders with certain kinds of businesses. Thus, an account holder known to have higher income might be attracted to certain retail businesses catering to higher income consumers. When paths of multiple high income account holders have common or intersecting locations in their transaction paths, such locations might be well suited for a such retail businesses.

Turning now to FIG. 1, there is shown a map of a geographical area in which several card holders travel as identified by their transaction cards (Card A, Card B, Card C, Card D, Card E and Card F), which in the described embodiment are credit cards. Locations associated with the various cards may be a starting point ("start") for each card holder (such as a personal residence or billing address of the card holder), and points where that account holder has stopped to use the credit card to conduct a transaction, which are each shown as box having the same letter as the card used in the transaction (e.g., for the card holder using Card A, each retail location where the card holder has made a purchase is identified by one of the boxes identified as "A"). The ending point ("end") in the path traveled (the last location where the card was used on a specific date or over some other period of time) is also shown. Thus, the starting point and the ending point are interconnected to form a transaction path, which indicates the path taken by the card holder to conduct the various transactions from the starting point to the ending point. Each path is identified to correspond to the card being used (Path A, Path B, Path C, Path D, Path E, and Path F).

It should be noted that the size of the geographical are in FIG. 1 has been chosen to encompass routine travel patterns for card holders, such as those using Cards A-F, and thus it is seen to include several cities (City A, City B, City C, and City D) that are somewhat close to each other. However, it should be appreciated that, while many transaction paths will be concentrated in local areas (where consumers are likely to regularly use their cards), the size and scope of the area that can be evaluated for transaction paths can be smaller (e.g., within a single city and its immediate surroundings) or much larger, such as a state, a country, or even the world.

For ease of description, FIG. 1 has been simplified. Thus, only a single path is shown for each card holder (representing travel in one direction), for a single day (e.g. one twenty-four hour day). In actual practice, each card holder would likely have a return path (it may be the same as the path illustrated, or could be a different path), especially if the starting point each day is a personal residence. In addition, for comprehensive data, a card holder might be tracked over a longer period of time (such as a week or two weeks), and thus one card holder may have numerous paths (each from a starting point to an ending point) during that longer period of time. Also, while the illustrated paths show only a few locations where the card holders have stopped to conduct a transaction, some card holders may have many more stops, and their paths may be more complex and extend in many different directions over the course of the period being tracked.

Each transaction has certain data or data sets associated with it, as determined by information and data collected at the merchant location where the transaction is conducted. For example, in one embodiment, each transaction may include an account identifier (to identify the account and card holder), a merchant identifier (which would include, among other things, information on the location of the merchant), a dollar amount, a date and time of the transaction, and a merchant classification or similar code (identifying the type or classification that has been assigned to the merchant). In other embodiments, the transaction data may include other information useful to the analysis, such as merchant specific flags, merchant outlet identifier, number of products/services in the transaction, product category or type, payment type (credit card, debit card, check, etc.), transaction category type (sale, cash advance, return, etc.), transaction authorization (authorize, decline, etc.), the average amount of transactions at the merchant location, the total number of transactions at the merchant location, and the total amount of all transactions at the merchant location. Data collected could be chosen in order to provide, among other things, insight into the spending patterns/habits of the card holder (e.g., the kinds of products or services that card holder most frequently purchases or is likely to purchase).

In some instances the data collected at each merchant location is referred to as a transaction path "vector," representing both (1) the geographical location or point of the merchant at which the data has been collected (to give directionality to the path, based on the starting point or previous transaction location) and (2) underlying transaction data for that geographical location. The vectors are combined to form the overall path that interconnects the transactions (and the starting point and ending point), as well as to associate transaction data with the path.

FIG. 2 illustrates summaries of the transactions for each of Card A through Card F, including the number of transactions (Txns) in a path or pattern, the total amount of the transactions, and the period of time over which transactions occur. As noted earlier, the simplified paths in FIG. 1 show only a single path for each card (over a duration of one day). The actual paths that would reflect all of the transactions in FIG. 2 could be more extensive and complex, and show patterns over multiple days on a longer duration.

Turning now to FIG. 3, there is illustrated a flow diagram for carrying out a process in accordance with one embodiment of the invention. At step 310, transaction data is collected from transactions as they are conducted by card holders, and aggregated for evaluation. At step 312, the data for each transaction is evaluated to determine the location of the merchant involved. In one embodiment, this is accomplished by determining a location from the merchant identifier associated with the transaction.

At step 314, a transaction path is generated or developed for each card and account holder. The path is formed by linking the transaction locations (as well as a starting point and an ending point). The starting point, in one embodiment, may be the personal residence or billing address of the card holder, or other location where the card holder is known to start the day (e.g., as determined by evaluating the card holder's personal information), rather than a transaction location. In an alternative embodiment, the starting point may be the first transaction conducted by the card holder (at the beginning of a day or other reporting time period). The ending point may be the last transaction conducted by the card holder during the reporting period. However, in some embodiments, the ending point may be deemed to be the same as the starting point (e.g., the personal residence of the card holder, and thus would result in a return path back to the starting point).

Also, in some cases there might be multiple alternative path segments or routes between merchant locations, any one of which could be used in generating a transaction path. The path segments used for the transaction path could be determined based on a preferred automobile route between merchant locations (as determined by conventional automobile routing/directions applications, such as MapQuest or Google Maps). In alternative embodiments, the path segments might be determined based on prior transaction paths of the same card holder (e.g., prior transaction paths for the same cardholder may have additional merchant locations used by the card holder that would indicate a preferred or likely route taken by the card holder).

At step 316, each of the transaction paths (for multiple card holders) are then evaluated to determine common path features and other relationships among the paths. In some instances, a common feature may be points of intersecting paths (e.g. as illustrated in FIG. 1 by intersecting Path E and Path F). In other embodiments, a common feature may be the close proximity of paths to each other, even if they do not intersect (e.g., paths that are all relatively close together in a geographical corridor, as illustrated in FIG. 1 by the close proximity of portions of Path A, Path B and Path E, and by the close proximity of portions of Path C and Path D). One advantage to evaluating common features of paths (as opposed to merely evaluating the locations of transactions) is that marketing research and decisions can be made based on the paths traveled by consumers and not just on locations where they conduct transactions.

At step 318, transaction data associated with the transaction paths are evaluated for common features (common card holder interests, spending habits, etc.). As discussed earlier, the determined common transaction features are useful to develop marketing data for various purposes, such as finding locations for new businesses based on transaction paths of consumers that may have common attributes or spending patterns. If a number of consumers having common attributes or spending habits follow the same or similar paths when conducting transactions, a decision might be made regarding a retail location that that would relate to those spending habits (such as a opening a new business that might appeal to those consumers). There are various components of transaction data that can be evaluated at step 318. Merchant classification codes (for transactions conducted) could be evaluated to determine the types of businesses that the consumer traveling the path might have an interest in. The amount of transactions can be evaluated, (e.g., to determine how much a consumer along that path is likely to spend). In some embodiments, personal information concerning the consumer (home address, income and other data apart from specific transactions) can also be evaluated for purposes of developing marketing research concerning the consumers that travel various paths.

Finally, at step 320, the data resulting from the preceding steps is reported, for example, to a entity that might analyze or act on the data. The data might be evaluated through use of a computer (mining the data for purposes of making marketing decisions), or by a human analyst, or a combination thereof.

It should be noted that while examples have been given for the use of the data developed (e.g., to determine locations for new retail businesses), other uses are also possible. As examples, advertising, coupons and other promotional material can be sent to a card holder based on the transaction path generated for that consumer. As a specific example, advertising for businesses located along a transaction path can be directed to a consumer that travels that path.

It should also be noted that as data is collected (e.g., at step 310), there may be certain transactions and data that are not as useful as others. Among other things, a transaction (and a merchant location associated with such a transaction) may be a one-time event resulting from circumstances that are unlikely to be repeated by the consumer. For example, if a consumer normally uses a card account in one part of the country, a temporary use of the card at locations in another part of the country for a short period of time may be the result of travel unlikely to be repeated by the consumer. By evaluating past transactions and transaction paths, such a one time event or circumstance can be recognized as not likely to be repeated, and can be removed as "noise" in the generation and evaluation of transaction paths at steps 314 and 316.

Figure 4:
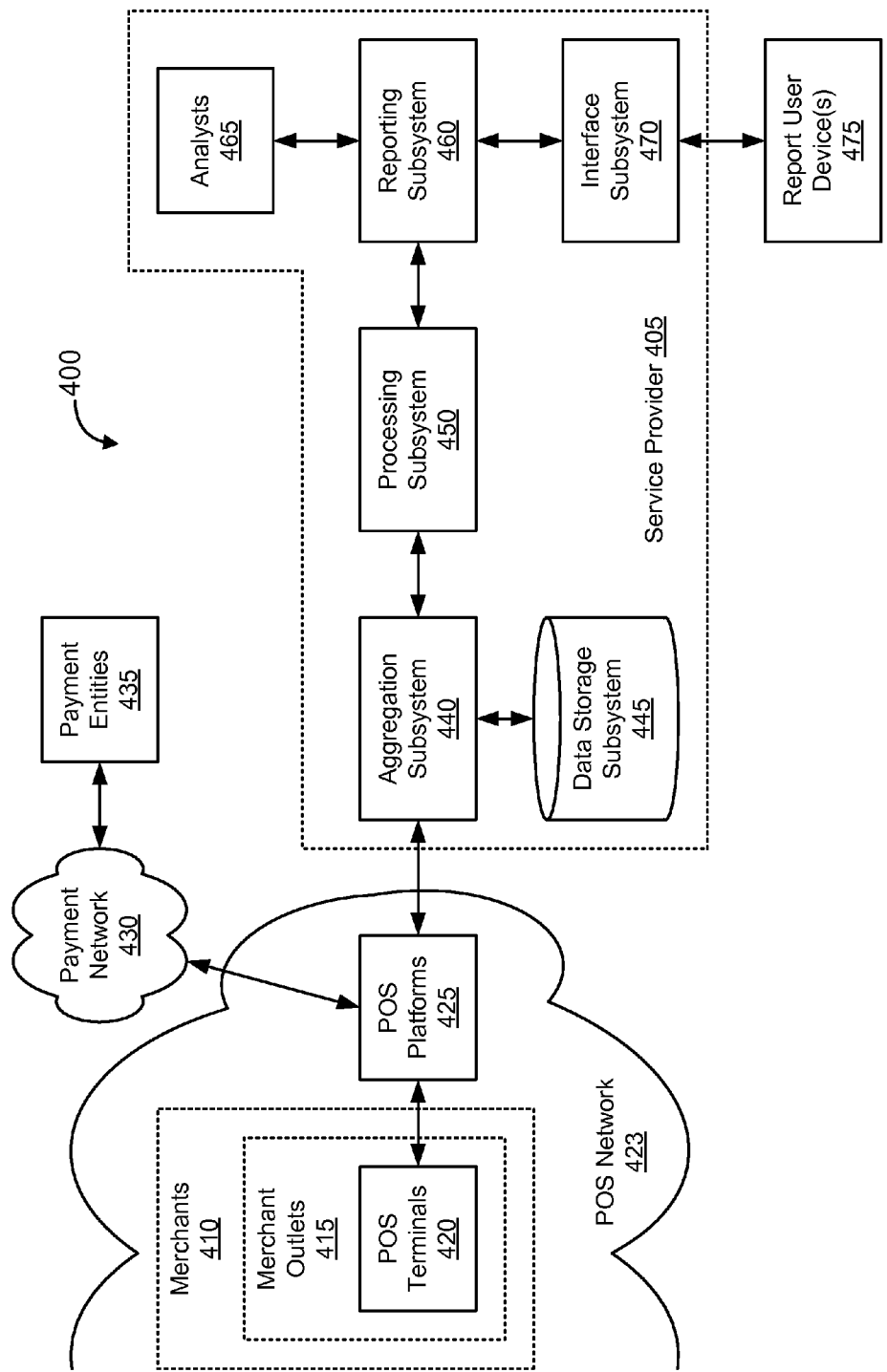
FIG. 4 is a block diagram of a system for carrying out the process seen in FIG. 3.

FIG. 4 illustrates a network 400 that could be used in carrying out the process of FIG. 3.

As illustrated, a service provider 405 is in communication with a number of POS terminals 420 that are in further communication with a payment network 430. The POS terminals may be part of a POS network 423 and are connected to the payment network 430 and the service provider 405 through a POS platform 425.

Transactions are effectuated via the POS terminals 420 (e.g., using payment cards and/or other known forms of payment). In some embodiments, payment entities 435 interact with the payment network 430, for example, to perform various authorization and/or other functions relating to the transactions. Data from the transactions may be aggregated by the service provider 405 for use in generating market report data. In some embodiments, one or more report user devices 475 are in communication with the service provider 405, for example, to exploit the generated market report data.

Use of POS terminals 420 in effectuating transactions is well known in the art. As such, and for the sake of clarity, specific operations of POS terminals 420, POS networks 423, payment networks 430, payment entities 435, etc. will not be fully described herein. Rather, these and related terms and phrases should be broadly construed to include any transaction facilitating devices, systems, and techniques that are useable in the context of the various embodiments described herein.

For example, as used herein, POS terminals 420 may include cash registers, and any other alternative and/or peripheral devices or systems, including hardware and/or software, for effectuating transactions between a merchant and a consumer. POS platforms 425, as used herein, include any hardware and/or software for facilitating communications between one or more POS terminals 420 and the payment network 430 and/or service provider 405. In one embodiment, the POS platforms 425 include proprietary platforms, such as merchant platforms offered by First Data Corporation. In some embodiments, one or more interfaces are included with the POS terminals 420 and/or the POS platforms 425 to facilitate use by end consumers (e.g., card holders, payors, etc.), salespersons, etc. The POS network 423, as used herein, is intended to broadly include any type of physical or virtual network, including one or more communications networks, corporate networks, etc. For example, a large number of globally distributed POS terminals 420 may, in some embodiments, be considered as part of a global POS network 423, even where some or all of the POS terminals 420 in the POS network 323 may not be in communication with one another.

As used herein, "POS terminals" are intended to include both physical terminals located at brick and mortar locations as well as virtual terminals (some type of computer system) capable of receiving and processing transaction requests. For example, financial transactions occurring other than at brick and mortar locations can include Internet transactions (typically involving a merchant web site or other payment portal, such as PayPal), mobile transactions made using a mobile device or phone, and the like. For these transactions, payment information is transmitted over some type of network to a computer system that is capable of receiving such transactions and then processing them to complete the financial transaction. It will be appreciated, however, that some transactions using mobile devices (such as mobile phones, iPads, and the like) can be made by directly or indirectly interfacing with POS terminals located in brick and mortar locations as well.

The POS terminals located at brick and mortar locations can capture transaction data in a number of ways, including by the use of payment cards with magnetic stripes, smart chips, RF transponders (RFID chips) or the like. The POS terminals can also read transaction information from non-traditional "cards," such as when reading information from checks or other negotiable instruments, such as by reading MICR lines, by the use of OCR scanners, by manually keying in data, or the like. Further, various communication channels can be used to transmit data from the payment vehicle to the POS terminal, such as by Bluetooth, cellular, RF, and the like. These configurations permit payments to be made using a variety of payment vehicles, including by credit cards, debit cards, checks or other negotiable instruments, ACH transactions, prepaid cards or accounts, stored value cards or accounts, and the like. In each of these, the appropriate information will be captured from the transaction at the POS terminal so that reports may be produced as described herein.

Hence, when receiving the transaction data, the POS terminals capture data pertinent to conducting a transaction, such as the amount of the transaction, the payment instrument or vehicle, the time of the transaction, and the like. The POS terminals also provide information on the location of the POS device (or location of the merchant—by physical address, web site or the like).

As illustrated, some or all of the POS terminals 420 may be located at (e.g., inside, on the property of, in close proximity to, etc.) a merchant outlet 415. The merchant outlet 415 may be the only one, or one of many, locations of a particular merchant 310. For example, each merchant outlet 415 may be a physical store location, a franchise location, a branch office, virtual presence, etc. of a merchant 410. Of course, where the merchant 410 has only a single location, the merchant outlet 415 and the respective merchant 410 may be one and the same.

Embodiments of the POS terminals 420 are configured to be associated with certain types of information and to collect certain types of information. For example, each POS terminal 320 may collect and/or be associated with terminal information and transaction information, as described earlier. The transaction and terminal information may be sent to the POS platforms 425 for various types of processing. For example, some or all of the information may be sent to the payment network 330 for authorization by one or more payment entities 435 (e.g., issuing banks, payment card companies, etc.), and/or the information may be sent to the service provider 405.

Functions of the service provider 405 may be carried out by one or more subsystems. In various embodiments, components of the subsystems are implemented, in whole or in part, in hardware. Thus, they may include one or more Application Specific Integrated Circuits (ASICs) adapted to perform a subset of the applicable functions in hardware. Alternatively, the functions may be performed by one or more other processing units (or cores), on one or more integrated circuits (ICs). In other embodiments, other types of integrated circuits may be used (e.g., Structured/Platform ASICs, Field Programmable Gate Arrays (FPGAs), and other Semi-Custom ICs), which may be programmed. Each may also be implemented, in whole or in part, with instructions embodied in a computer-readable medium, formatted to be executed by one or more general or application specific controllers.

In some embodiments, data from all the POS terminals 420 is received and aggregated by an aggregation subsystem 440. The aggregation subsystem 440 generates and stores aggregated POS datasets in a data storage subsystem 445. Embodiments of the data storage subsystem 445 may include any useful type of data storage. For example, the data storage subsystem 445 may include servers, hard disks, etc. Further, the aggregated data may be stored using any useful types of security, data structure, etc. In one embodiment, the aggregated data is stored as an associative database to facilitate various types of data processing functions (e.g., mining, filtering, sorting, etc.).

In some embodiments, as described more fully below, the aggregated data may be processed by a processing subsystem 450. Embodiments of the processing subsystem 450 are configured to generate various types of market trend and/or other data for use by a reporting subsystem 460. Embodiments of the reporting system 460 use the data generated by the processing subsystem 450 to generate one or more types of market reports. In some embodiments, additional information is used to generate reports, including data received from one or more analysts 465 and/or other data sources.

The service provider 405 may further include an interface subsystem 470 to facilitate interaction with and/or delivery of reporting data generated by the reporting subsystem. In some embodiments, one or more report user devices 475 interface with the service provider via the interface subsystem 470. For example, the report user devices 475 may request certain reports, receive report data for viewing, etc.

Other details of the network 400, and the various components, features and functions thereof, may be found in U.S. patent application Ser. No. 13/314,988, for "Transaction Location Analytics Systems And Methods," filed Dec. 8, 2011, the complete disclosure of which is herein incorporated by reference.

Figure 5:
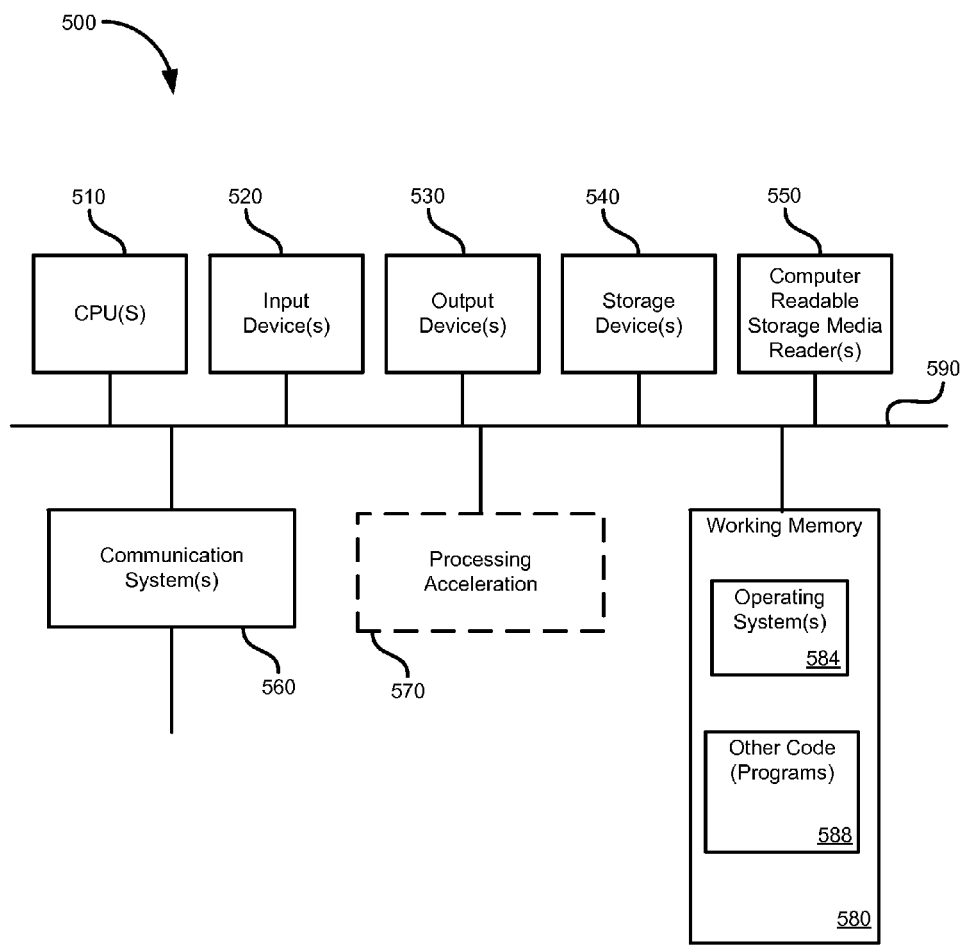
FIG. 5 is a block diagram illustrating an exemplary computer system upon which embodiments of the present invention may be implemented.

FIG. 5 is a block diagram illustrating an exemplary computer system upon which embodiments of the present invention may be implemented. This example illustrates a computer system 500 such as may be used, in whole, in part, or with various modifications, to provide the functions of the systems, components and devices seen in FIG. 4.

The computer system 500 is shown comprising hardware elements that may be electrically coupled via a bus 590. The hardware elements may include one or more central processing units 510, one or more input devices 520 (e.g., a mouse, a keyboard, etc.), and one or more output devices 430 (e.g., a display device, a printer, etc.). The computer system 500 may also include one or more storage devices 540, representing remote, local, fixed, and/or removable storage devices and storage media for temporarily and/or more permanently containing computer-readable information, and one or more storage media reader(s) 550 for accessing the storage device(s) 540. By way of example, storage device(s) 540 may be disk drives, optical storage devices, solid-state storage device such as a random access memory ("RAM") and/or a read-only memory ("ROM"), which can be programmable, flash-updateable or the like.

The computer system 500 may additionally include a communications system 560 (e.g., a modem, a network card—wireless or wired, an infra-red communication device, a Bluetooth™ device, a near field communications (NFC) device, a cellular communication device, etc.) The communications system 560 may permit data to be exchanged with a network, system, computer, mobile device and/or other component as described earlier. The system 500 also includes working memory 580, which may include RAM and ROM devices as described above. In some embodiments, the computer system 500 may also include a processing acceleration unit 570, which can include a digital signal processor, a special-purpose processor and/or the like.

The computer system 500 may also comprise software elements, shown as being located within a working memory 580, including an operating system 584 and/or other code 588. Software code 588 may be used for implementing functions of various elements of the architecture as described herein. For example, software stored on and/or executed by a computer system, such as system 500, can be used in implementing the process seen in FIG. 3.

It should be appreciated that alternative embodiments of a computer system 500 may have numerous variations from that described above. For example, customized hardware might also be used and/or particular elements might be implemented in hardware, software (including portable software, such as applets), or both. Furthermore, there may be connection to other computing devices such as network input/output and data acquisition devices (not shown).

While various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention. As one example, the systems at the service provider 405 may be implemented by a single system having one or more storage device and processing elements. Alternatively, the systems at service provider 405 may each be implemented by plural systems, with their respective functions distributed across different systems either in one location or across a plurality of linked locations.

Moreover, while the various flows and processes described herein (e.g., those illustrated in FIG. 3) are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise. Further, the term "exemplary" used herein does not mean that the described example is preferred or better than other examples.

Consequently, although the invention has been described with respect to exemplary embodiments, it will be appreciated that the invention is intended to cover all modifications and equivalents within the scope of the following claims.

What is claimed is:

1. A method for evaluating transaction patterns of account holders to determine common points in paths traveled by account holders in a geographical area, the method comprising:
receiving and storing by an aggregation subsystem of a host computer system from POS devices a plurality of POS datasets for a plurality of transactions conducted by account holders, wherein:
the host computer system comprises a processing subsystem configured to process the plurality of POS datasets, a data storage subsystem configured to store the plurality of POS datasets, and an interface subsystem configured to facilitate communication between the host computer system and a user device;
each POS dataset comprises at least a merchant identifier, an account identifier, and a transaction amount;
with the processing subsystem of the host computer system, evaluating the POS datasets to determine a merchant location for each of the transactions;
with the processing subsystem of the host computer system, generating a plurality of geographical transaction paths, each transaction path having a starting point and an ending point, with the starting and ending points interconnected based on the merchant locations and the POS datasets, each transaction path representing a traveled geographical path of merchant locations for transactions conducted by an account holder and locations along path segments between the merchant locations;
evaluating, using the processing subsystem, the plurality of geographical transaction paths to identify common features of the transaction paths, the common features representing locations having points of intersection or close proximity in the plurality of transaction paths;
generating a report showing the results of the evaluation of the transaction; and
transmitting, using the interface subsystem, the report to a user device, wherein the report causes the report to display on the user device.

2. The method of claim 1, wherein each transaction path corresponds to one account holder, and wherein the method further comprises evaluating the transactions at the merchant locations along each transaction path.

3. The method of claim 2, wherein the transactions along each transaction path are evaluated in order to determine spending patterns of the corresponding account holder.

4. The method of claim 2, wherein evaluating the transactions at the merchant locations along each transaction path further comprises identifying spending patterns of each of the account holders having transaction paths with common features.

5. The method of claim 2, wherein evaluating the transactions at the merchant locations along each transaction path comprises evaluating one or more of:
the average amount of transactions at the merchant locations;
the total number to transactions at the merchant locations;
the total amount of all transactions at the merchant locations;
a merchant classification at each of the merchant locations;
product categories of transactions at the merchant locations;

payment instrument categories of transactions at the merchant locations; and
transaction categories of transactions at the merchant locations.

6. The method of claim 1, wherein at least one of the starting point and ending point comprises a residence address for the account holder.

7. The method of claim 1, wherein at least one of the starting point and ending point comprises a billing address for the account holder.

8. The method of claim 1, wherein the account identifier identifies an account, and wherein the account is a credit card account.

9. The method of claim 1, wherein the account identifier identifies an account, and wherein the account is selected from a group comprising a credit card account, and debit card account, a checking account, a savings account, a gift card account, a brokerage account and a loyalty account.

10. The method of claim 1, wherein each transaction path is generated based on transactions conducted over a predetermined period of time.

11. The method of claim 1, wherein the predetermined period of time is a twenty-four hour period.

12. A system for evaluating transaction patterns of account holders in order to determine common points in paths traveled by account holders in a geographical area, comprising:
  a plurality of POS devices at a plurality of merchant locations, each POS device generating a plurality of POS datasets for a plurality of transactions conducted by account holders, wherein each POS dataset comprises at least a merchant identifier, an account identifier, and a transaction amount;
  an aggregating system that receives the POS datasets and aggregates the datasets;
  a processing system that evaluates the POS datasets to determine a merchant location for each of the transactions, to generate a plurality of geographical transaction paths, each having a starting point and an ending point, with the starting and ending points interconnected based on the merchant locations and the POS datasets, each transaction path representing a traveled geographical path of merchant locations for transactions conducted by an account holder and locations along path segments between the merchant locations, to identify common features of the transaction paths that may be used for business planning, the common features representing locations having points of intersection or close proximity in the plurality of transaction paths, and to generate a report showing the identified common features; and
  an interface system configured to transmit the report to a user device, wherein the report causes the report to display on the user device.

13. A system for determining common points in paths traveled by account holders in a geographical area, comprising:
  a plurality of POS devices at a plurality of merchant locations;
  a processor; and
  a memory communicatively connected with and readable by the processor, the memory containing instructions that, when executed by the processor, cause the processor to evaluate transaction patterns, by:
    receiving by aggregation subsystem of a host computer system and storing at a data storage subsystem of a host computer system, from the POS devices a plurality of POS datasets for a plurality of transactions conducted by account holders, wherein each POS dataset comprises at least a merchant identifier, an account identifier, and a transaction amount;
    evaluating the POS datasets to determine a merchant location for each of the transactions based on the merchant identifier;
    generating a plurality of transaction paths based on the merchant locations and the POS datasets, each transaction path having a starting point and an ending point, with the starting and ending points interconnected by merchant locations, and representing a traveled geographical path of merchant locations for transactions conducted by an account holder and locations along path segments between the merchant locations; and
    evaluating the plurality of transaction paths to identify common features of the transaction paths for purposes of business planning;
    generating a report showing the results of the evaluation of the transaction paths; and
    transmitting the report to a user device via an interface subsystem of the host computer system, wherein the report causes the report to display on the user device.

14. The system of claim 13, wherein each transaction path corresponds to one account holder, and wherein the memory further contains instructions that, when executed by the processor, cause the processor to evaluate transaction patterns by: evaluating the transactions at the merchant locations along each transaction path.

15. The system of claim 14, wherein the transactions along each transaction path are evaluated in order to determine spending patterns of the corresponding account holder.

16. The method of claim 14, wherein evaluating the transactions at the merchant locations along each transaction path further comprises identifying spending patterns of each of the account holders having transaction paths with common features.

17. The system of claim 14, wherein evaluating the transactions at the merchant locations along each transaction path comprises evaluating one or more of:
  the average amount of transactions at the merchant locations;
  the total number to transactions at the merchant locations;
  the total amount of all transactions at the merchant locations;
  a merchant classification at each of the merchant locations;
  product categories of transactions at the merchant locations;
  payment instrument categories of transactions at the merchant locations; and
  transaction categories of transactions at the merchant locations.

18. The system of claim 13, wherein at least one of the starting point and ending point comprises a residence address for the account holder.

19. The system of claim 13, wherein at least one of the starting point and ending point comprises a billing address for the account holder.

20. The system of claim 13, wherein the account identifier identifies an account, and wherein the account is a credit card account.

21. The system of claim 13, wherein the account identifier identifies an account, and wherein the account is selected from a group comprising a credit card account, and debit card account, a checking account, a savings account, a gift card account, a brokerage account and a loyalty account.

22. The system of claim 13, wherein each transaction path is generated based on transactions conducted over a predetermined period of time.

23. The system of claim 22, wherein the predetermined period of time is a twenty-four hour period.

24. The system of claim 13, wherein the memory further contains instructions that, when executed by the processor, cause the processor to generate a plurality of transaction paths by linking the merchant locations to form the path segments.

25. The system of claim 24, wherein the path segments may be determined by an automobile routing application.

26. The system of claim 24, wherein the path segments may be determined based on prior transaction paths of the account holder conducting transactions at the linked merchant locations.

* * * * *